US011555348B2

(12) United States Patent
Azer

(10) Patent No.: US 11,555,348 B2
(45) Date of Patent: Jan. 17, 2023

(54) SEALING STRIP FOR FURNITURE

(71) Applicant: Donald W. Azer, Rochester, NY (US)

(72) Inventor: Donald W. Azer, Rochester, NY (US)

( * ) Notice: Subject to any disclaimer, the term of this patent is extended or adjusted under 35 U.S.C. 154(b) by 0 days.

(21) Appl. No.: 17/200,938

(22) Filed: Mar. 15, 2021

(65) Prior Publication Data

US 2021/0317701 A1 Oct. 14, 2021

Related U.S. Application Data

(60) Provisional application No. 63/007,202, filed on Apr. 8, 2020.

(51) Int. Cl.

*E06B 7/22* (2006.01)
*E06B 7/23* (2006.01)
*B60J 10/24* (2016.01)
*B60J 10/34* (2016.01)

(52) U.S. Cl.

CPC ................. *E06B 7/22* (2013.01); *B60J 10/24* (2016.02); *B60J 10/34* (2016.02); *E06B 7/2303* (2013.01)

(58) Field of Classification Search

CPC ........ E06B 7/22; E06B 7/2303; E06B 7/2309; E06B 7/2314; E06B 7/2301; F25D 23/087; B60J 10/248; B60J 10/24; B60J 10/34; B60J 10/80

USPC ............................................. 49/475.1, 498.1

See application file for complete search history.

(56) References Cited

U.S. PATENT DOCUMENTS 1,928,992 A * 10/1933 Masterman .......... B29D 23/001 138/45
2,705,655 A * 4/1955 Flemming ................ B60J 10/27 49/495.1
4,214,036 A * 7/1980 Bright ....................... B60J 10/16 52/716.5
4,617,220 A * 10/1986 Ginster ................. E06B 7/2309 428/3
4,928,431 A * 5/1990 Kuzuhara ................ B60J 10/21 49/498.1
4,991,352 A * 2/1991 Hyer ...................... F24C 15/021 49/489.1
6,112,469 A * 9/2000 Vuillemot ............. E06B 7/2303 49/498.1
6,474,654 B1 * 11/2002 Schmeichel ............. B60J 10/34 277/645

(Continued)

*Primary Examiner* — Justin B Rephann
(74) *Attorney, Agent, or Firm* — Ashok Tankha

(57) ABSTRACT

A sealing strip disclosed herein comprises a deformable sealing profile with a teardrop cross-section, a channel running along a length of the sealing strip, multiple parallel aligned reinforcement ribs, and an adhesive layer on a first outwardly curved side on an outer surface of the deformable sealing profile. In an embodiment, the sealing strip comprises one of an E-shaped cross-section and about a 270 degree rotated generally T-shaped cross-section. In another embodiment, the cross-section of the sealing profile comprises a vertically aligned rectangular base portion and dovetail portion extending from a first lateral side of the rectangular base portion near the midway on the rectangular base portion. In another embodiment, the rectangular base portion comprises a first wall portion and a second wall portion extending from a first end and a second end, respectively, of the first lateral side of the rectangular base portion.

3 Claims, 17 Drawing Sheets

(56) References Cited

U.S. PATENT DOCUMENTS

| | | | | |
|---|---|---|---|---|
| 6,485,030 | B1 * | 11/2002 | Hahn | B60J 10/15 277/645 |
| 6,959,848 | B2 * | 11/2005 | Schmeichel | B60J 10/80 277/645 |
| 7,422,788 | B2 * | 9/2008 | Hahn | B60J 10/82 277/645 |
| 8,161,685 | B2 * | 4/2012 | Salgado | E06B 7/2316 292/DIG. 54 |
| 2006/0143988 | A1 * | 7/2006 | Dillmann | B60J 10/248 49/498.1 |
| 2006/0230686 | A1 * | 10/2006 | Plum | B60J 10/45 49/489.1 |
| 2011/0265388 | A1 * | 11/2011 | Salgado | E06B 7/2303 49/493.1 |

* cited by examiner

SEALING STRIP FOR FURNITURE

CROSS-REFERENCE TO RELATED APPLICATIONS

This application claims priority to and the benefit of the provisional patent application titled "Dust Proof Cabinets and Drawers", application No. 63/007,202, filed in the United States Patent and Trademark Office on Apr. 8, 2020. The specification of the above referenced patent application is incorporated herein by reference in its entirety.

BACKGROUND

People who live in environments where excessive dust is generated, for example, desert-like areas, etc., often experience an excessive amount of dust penetration and deposition within the home where they reside or in an office area where they work due to lack of adequate sealing between a window sash and a window frame when the window is closed. Dust may also enter and circulate the home or office through Heating/Air conditioning vents. Dust and other fine particulate matter can also make their way into closed cabinets and drawers, and deposit on pots, pans, clothing, files, etc. In such areas, residents need to spend an excessive amount of time cleaning and disinfecting their home and cabinets due to the dust that infiltrates the house through the windows of the house, and cabinets, etc.

Hence there is a long felt but unresolved need for a sealing strip that can be affixed in a groove in the window sash, window frame, cabinet door, drawer, etc. to minimize ingress of air-borne fine particulate matter and dust through the windows of the house to areas within the house and to the interior of cabinets located within the house. There is also a long felt but unresolved need for a sealing strip that can be affixed to an engagement surface of the window sash, window frame, cabinet door, drawer, etc.

SUMMARY OF THE INVENTION

This summary is provided to introduce a selection of concepts in a simplified form that are further disclosed in the detailed description of the invention. This summary is not intended to determine the scope of the claimed subject matter.

Various embodiments of the sealing strip disclosed herein address the above recited need for a sealing strip that can be affixed in a groove in a window sash, window frame, cabinet door, drawer, etc. Various embodiments of the sealing strip disclosed herein also address the need for a sealing strip that can be affixed to an engagement surface of the window sash, window frame, cabinet door, drawer, etc.

The sealing strip disclosed herein comprises a deformable sealing profile with a teardrop cross-section. The deformable sealing profile comprises a first outwardly curved side and a second outwardly curved side located opposite to the first outwardly curved side. The ends of the first outwardly curved side and the second outwardly curved side engage with each other to define a rounded leading edge, and a sharp trailing edge located opposite to the rounded leading edge. The sealing strip further comprises a channel running along a length of the sealing strip, multiple parallel aligned reinforcement ribs, and an adhesive layer on the first outwardly curved side on an outer surface of the deformable sealing profile. The parallel aligned reinforcement ribs are integrally defined on a sidewall of the hollow chamber proximal to the first outwardly curved side, and extend along the length of the sealing strip.

In an embodiment, the sealing strip disclosed herein comprises a sealing profile with a 270 degree rotated generally T-shaped cross-section. The sealing profile of the sealing strip comprises a vertical portion and a horizontal portion. The horizontal portion extends from a first lateral side of the vertical portion at a position about midway on the vertical portion.

In another embodiment, the sealing strip disclosed herein comprises a sealing profile with a vertically aligned rectangular base portion and a dovetail portion. The dovetail portion extends from a first lateral side of the rectangular base portion at about midway on the rectangular base portion.

BRIEF DESCRIPTION OF THE DRAWINGS

The foregoing summary, as well as the following detailed description of the invention, is better understood when read in conjunction with the appended drawings. For illustrating the invention, exemplary constructions of the invention are shown in the drawings. However, the invention is not limited to the specific structures disclosed herein. The description of a structure referenced by a numeral in a drawing is applicable to the description of that structure shown by that same numeral in any subsequent drawing herein.

DETAILED DESCRIPTION OF THE INVENTION

Figure 1A:
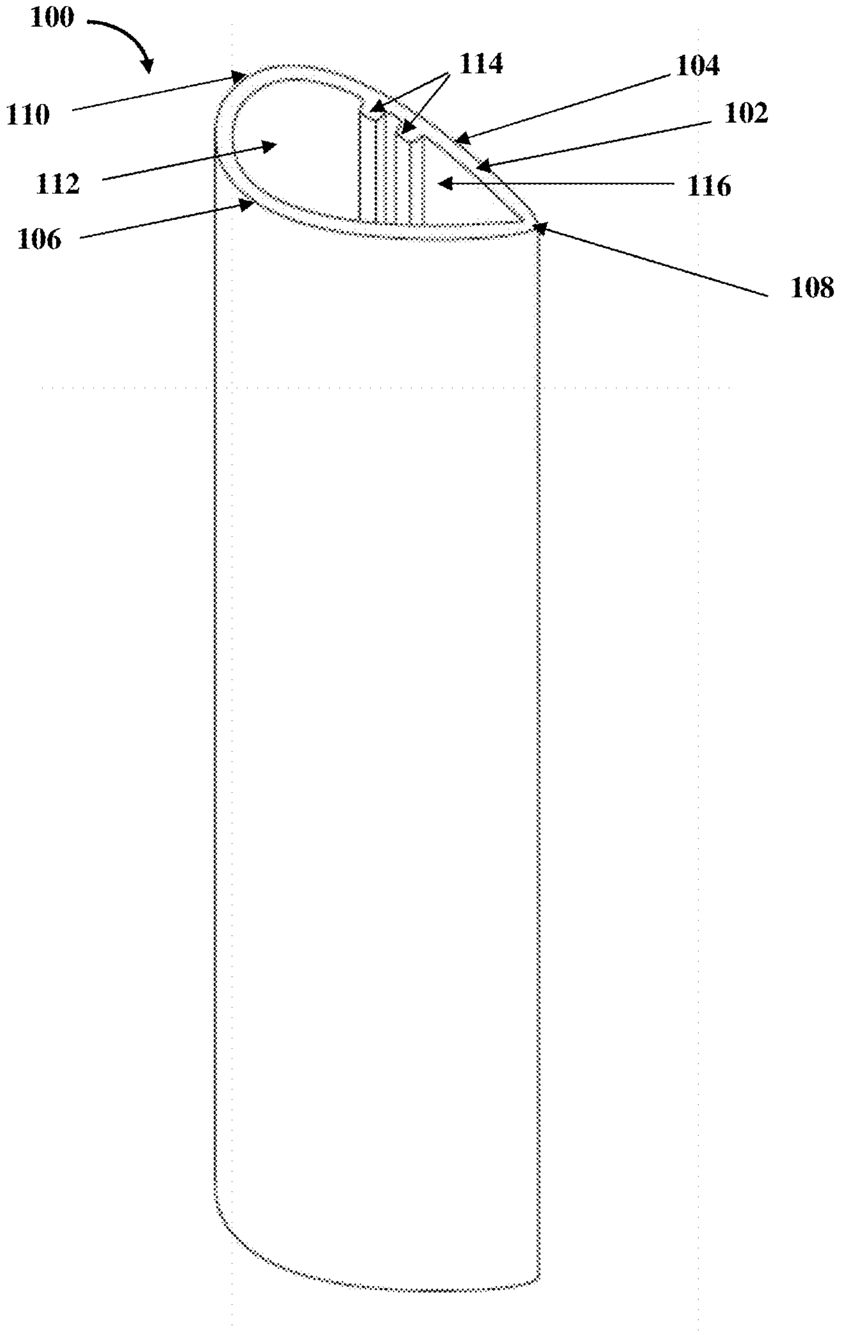
FIG. 1A exemplarily illustrates a top front perspective view of a sealing strip.
Figure 1B:
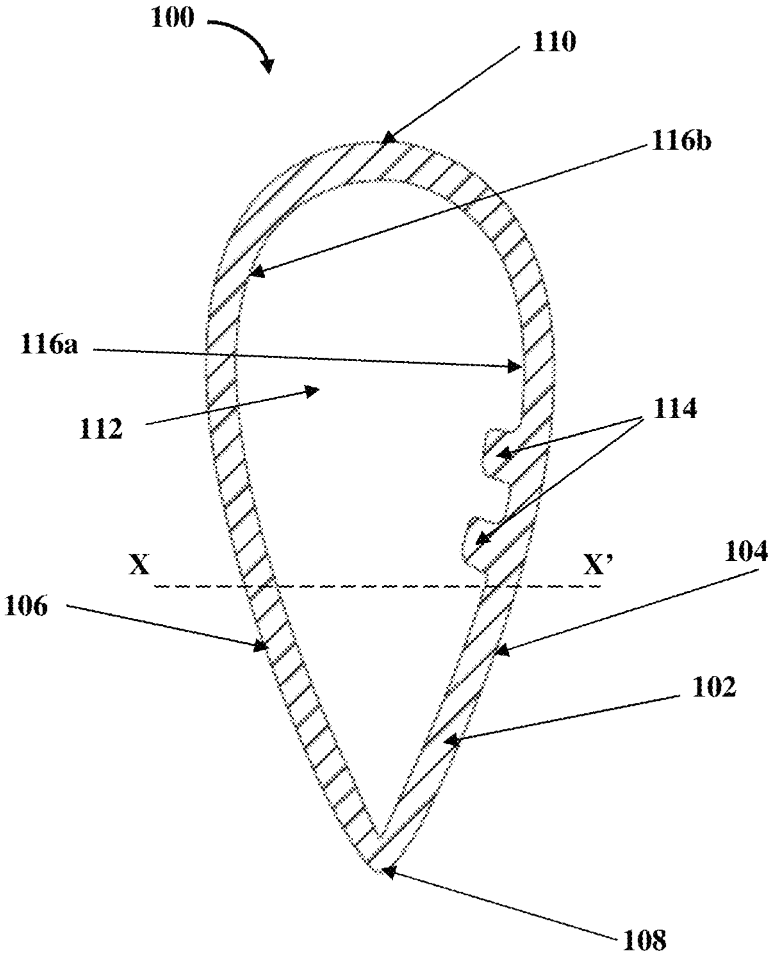
FIG. 1B exemplarily illustrates a cross-sectional view of the sealing strip shown in FIG. 1A.

FIG. 1A exemplarily illustrates a top front perspective view of the sealing strip 100. The sealing strip 100 disclosed herein comprises a sealing strip with a deformable sealing profile 102 comprising a teardrop cross-section, a channel 112 running along a length of the sealing strip 100, multiple parallel aligned reinforcement ribs 114 integral with the sealing strip 100 on a first sidewall 116*a* of the channel 112, and an adhesive layer 118 shown in FIG. 1C on a first outwardly curved side 104 on an outer surface 120 of the deformable sealing profile 102. FIG. 1B exemplarily illustrates the teardrop cross-section of the sealing strip 100. The deformable sealing profile 102 comprises the first outwardly curved side 104, and a second outwardly curved side 106 located opposite to the first outwardly curved side 104. The ends of the first outwardly curved side 104 and the second outwardly curved side 106 engage with each other to define a substantially rounded leading edge 110, and a sharp trailing edge 108 opposite to the rounded leading edge 110. The channel 112 of the sealing strip 100 also has a teardrop cross-section. Furthermore, the sealing profile 102 is concentric with the channel 112. Accordingly, the sealing profile 102 has a uniform thickness between the first outwardly curved side 104 and the channel 112, and between the second outwardly curved side 106 and the channel 112.

Figure 1C:
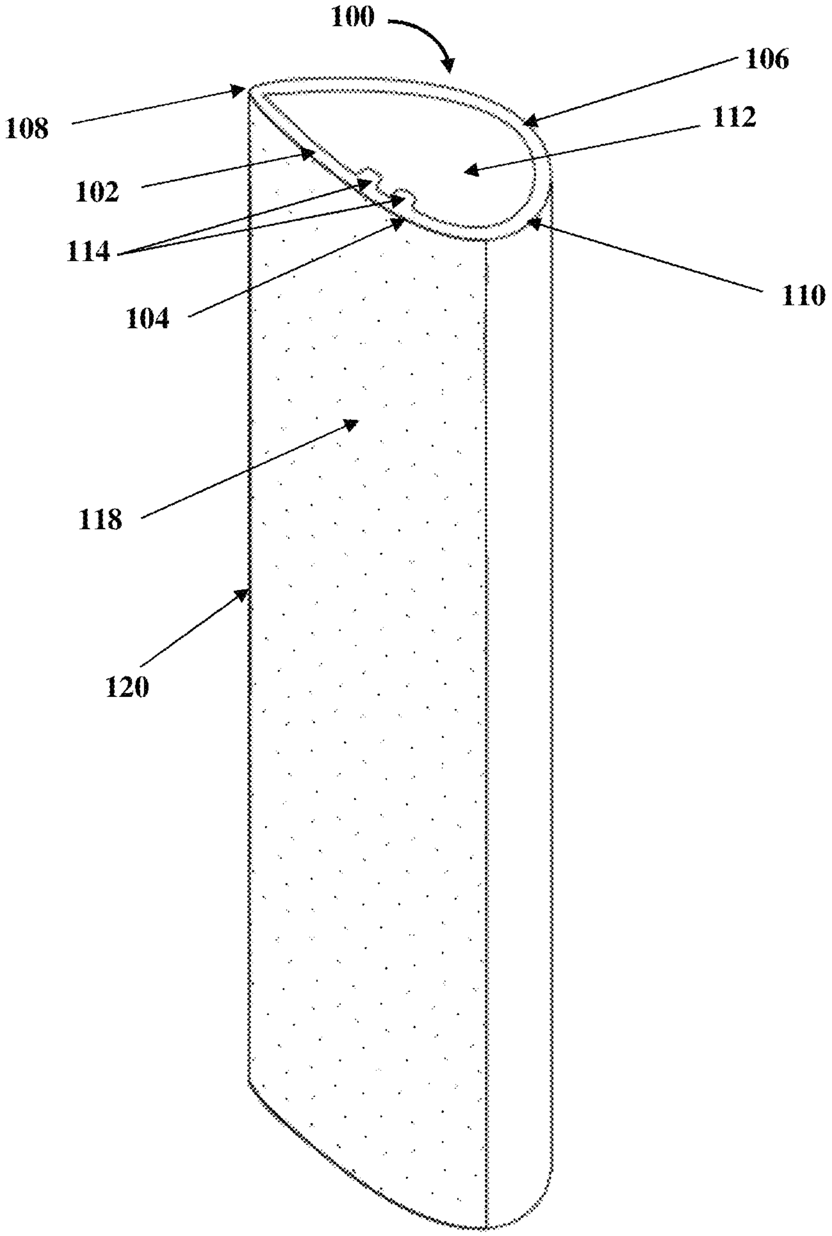
FIG. 1C exemplarily illustrates a top rear perspective view of the sealing strip shown in FIG. 1A.

FIG. 1C exemplarily illustrates a top rear perspective view of the sealing strip 100. As illustrated in FIG. 1C, an adhesive layer 118 is applied on the first outwardly curved side 104 on an outer surface 120 of the deformable sealing profile 102.

Figure 1D:
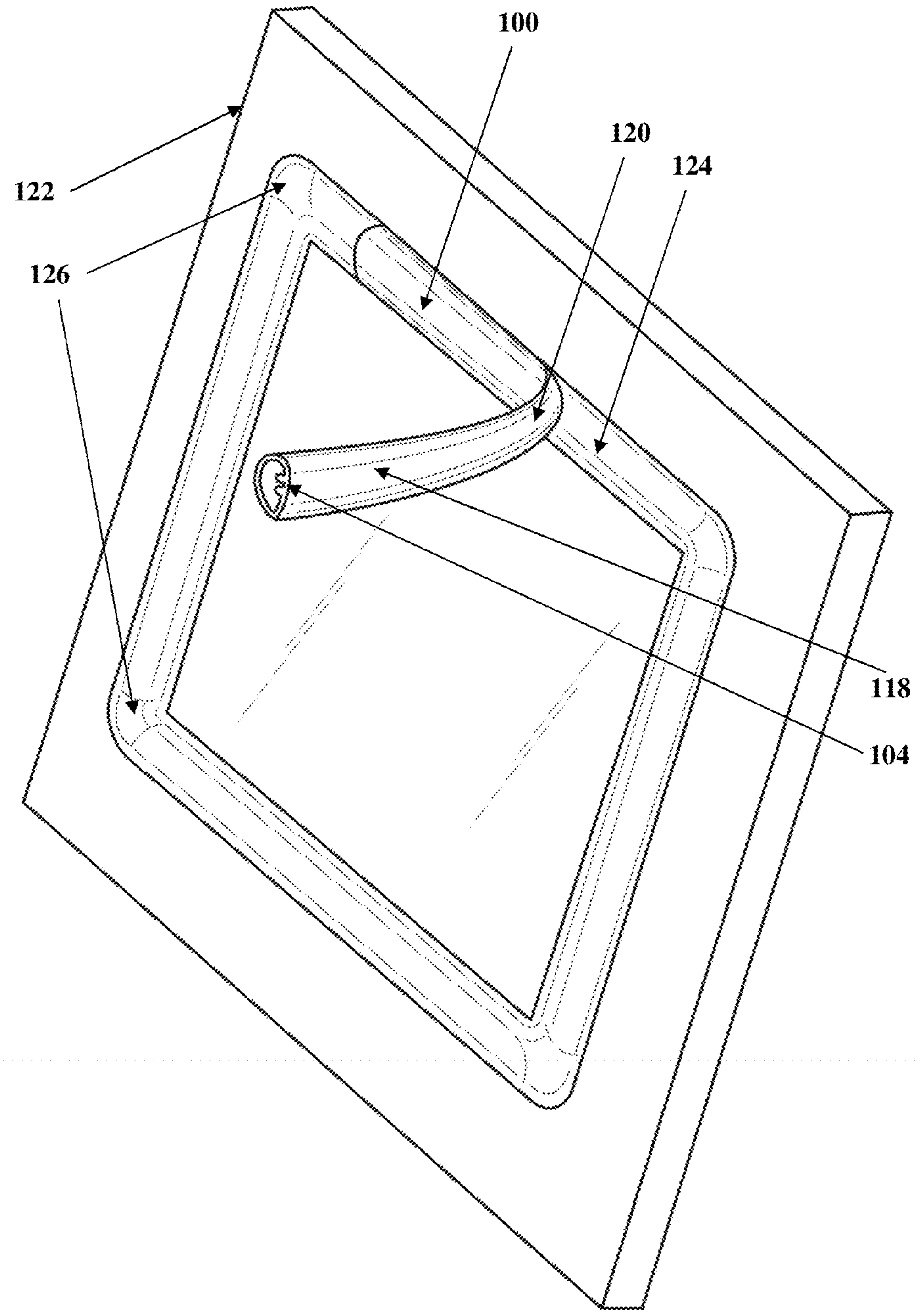
FIG. 1D exemplarily illustrates a perspective view of a cabinet door comprising a groove for affixing the sealing strip shown in FIG. 1A.

FIG. 1D exemplarily illustrates a perspective view of a cabinet door 122 comprising a groove 124 for affixing the sealing strip 100 shown in FIG. 1A. In an embodiment, the groove 124 is configured to accommodate the first outwardly curved side 104 of the sealing profile 102. The adhesive layer 118 is used to affix the first outwardly curved side 104 of the sealing strip 100 in the groove 124 of the cabinet door 122. In an embodiment, the sealing strip 100 is cut in the sharp trailing edge 108 to form a notch (not shown) to facilitate the inward bending of the sealing strip 100 and to thereafter affix the first outwardly curved side 104 sealing strip 100 inside the bends 126 in the groove 124. In an embodiment, the adhesive layer 118 is used to affix the first outwardly curved side 104 of the sealing strip 100 to a plane surface of the cabinet door 122 in the absence of a suitable groove 124 in the cabined door 122.

In an embodiment, the groove 124 configured to accommodate the first outwardly curved side 104 of the sealing profile 102 is about $1/8^{th}$ inch wide and about ½ inch deep. In an embodiment, the cross-section of the groove 124 matches the shape of the first outwardly curved side 104 of the sealing profile 102. In another embodiment, the groove 124 has a rectangular cross-section and the sharp trailing edge 108 is inserted into the groove 124 to affix the sealing strip 100 to the groove 124 of the cabinet door 122.

In an embodiment, the width of the sealing profile 102 between the substantially rounded leading edge 110 and the sharp trailing edge 108 is about ½ inch. In an embodiment, the thickness of the sealing profile 102 between the first outwardly curved side 104 and the second outwardly curved side 106 is about ⅜ inch. In an embodiment, the width of the channel 112 between the first sidewall 116*a* and the second sidewall 116*b* is about ¼ inch, and the width of the channel is between 10 mm to 8 mm. In an embodiment, the reinforcement ribs 114 extend by about 1 mm to about 2 mm from the first sidewall 116*a* of the channel 112. In an embodiment, the width of the reinforcement ribs 114 is about 1 mm to about 2 mm. In an embodiment, the reinforcement ribs 114 are located proximal to a mid-section of the sidewall 116 of the channel 112, as shown in FIGS. 1A-1C. The channel 116 further comprises a second sidewall 116*b*, as shown in FIG. 1B. In another embodiment, the width of the sealing profile 102 between the substantially rounded leading edge 110 and the sharp trailing edge 108 is about ⅜ inch, and the thickness of the sealing profile 102 between the first outwardly curved side 104 and the second outwardly curved side 106 is about ⅛ inch.

Figure 1E:
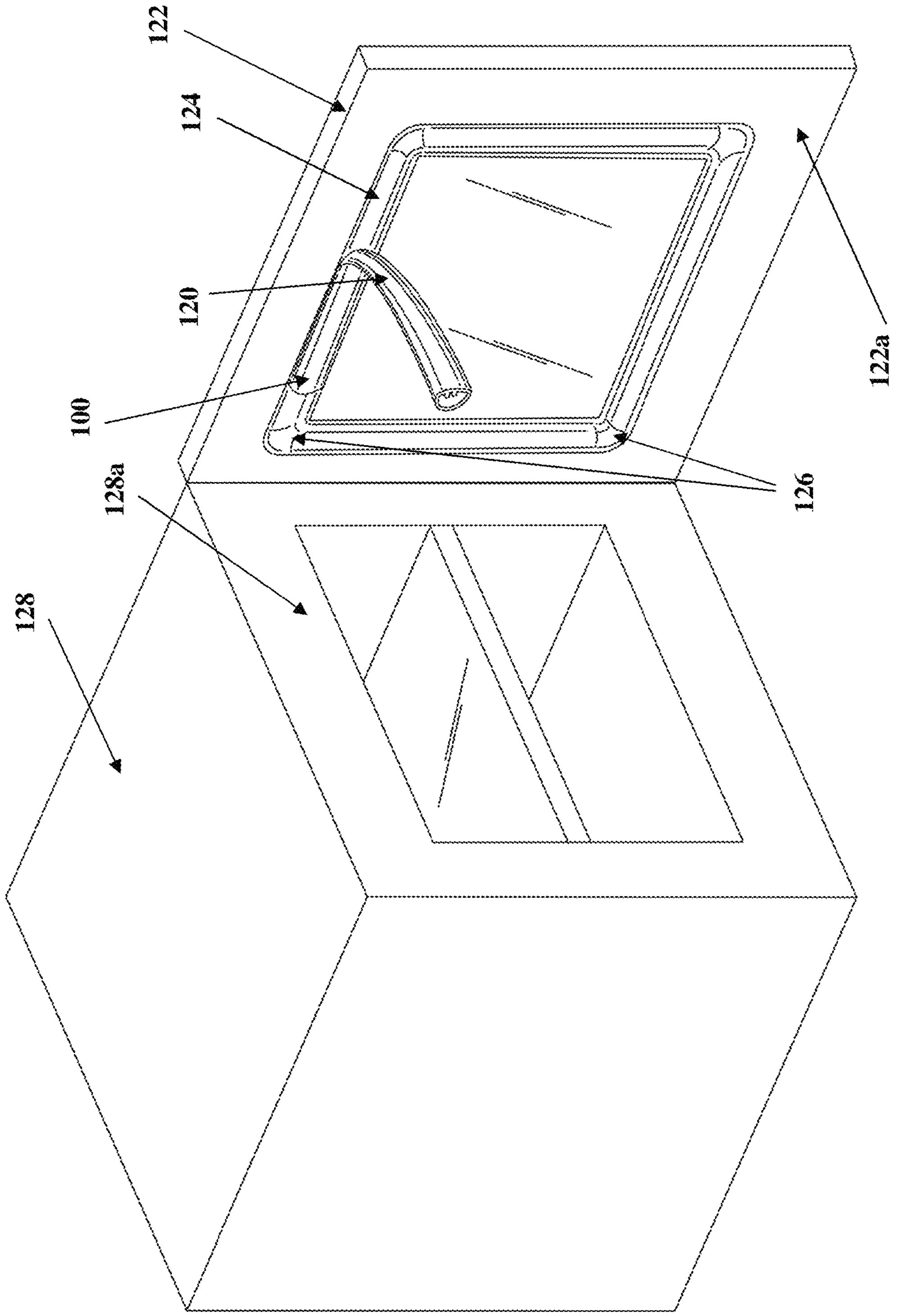
FIG. 1E exemplarily illustrates a perspective view of a cabinet having a cabinet door comprising the sealing strip shown in FIG. 1A.

During use, when the cabinet door 122 is shut, the deformable sealing profile 102 of the sealing strip 100 contacts a frontal frame 128*a* of a cabinet 128. The deformable sealing profile 102 deforms or compresses at the points of contact with the frontal frame 128*a* of the cabinet 128 to create a seal between the cabined door 122 and the cabinet frame 128 as illustrated in FIG. 1E. The parallel aligned reinforcement ribs 114 shown in FIGS. 1A-1C ensure that the first outwardly curved side 104 and the second outwardly curved side 106 do not contact each other when the deformable sealing profile 102 deforms or compresses when the cabinet door 122 is shut. Furthermore, the parallel aligned reinforcement ribs 114 increase the buckling strength of the sealing strip 100 along the X-X' axis illustrated in FIG. 1B.

Figure 2A:
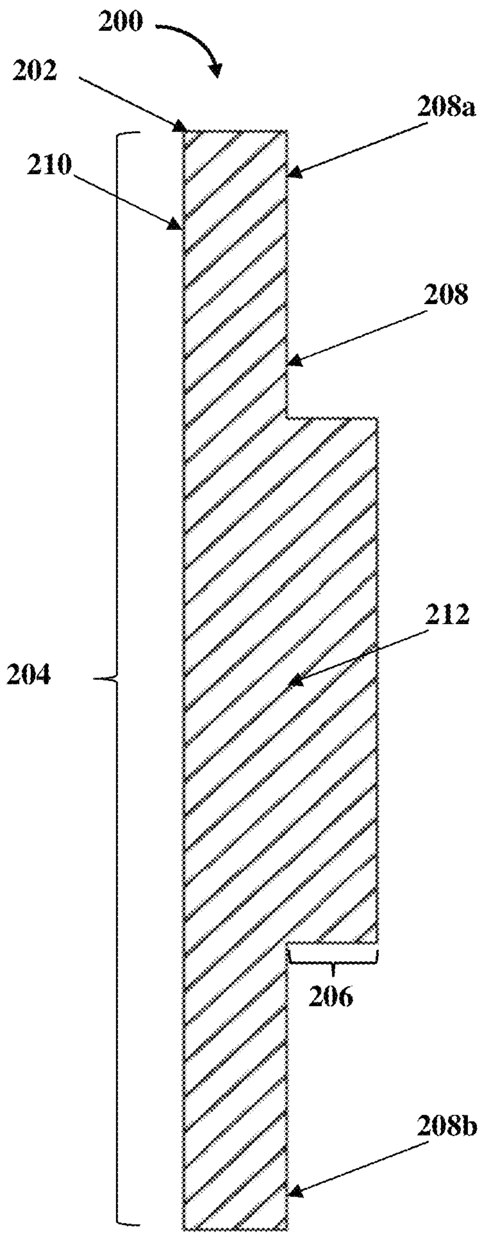
FIG. 2A exemplarily illustrates a cross-sectional view of a second embodiment of a sealing strip.

FIG. 2A exemplarily illustrates a cross-sectional view of a second embodiment of the sealing strip 200. This embodiment of the sealing strip 200 is used for sealing a gap between a first surface, for example, the surface of the frontal frame 128*a*, and a second surface, for example, a surface 122*a* of the cabinet door 122 that engages with the first surface, as exemplarily illustrated in FIG. 1E. This embodiment of the sealing strip 200 comprises a sealing profile 202 having about a 270 degree rotated generally T-shaped cross-section. The sealing profile 202 comprises a vertical portion 204 and a horizontal portion 206. The horizontal portion 206 extends from a first lateral side 208 of the vertical portion 204 at near about midway 212 on the vertical portion 204. The second lateral side 210 of the sealing strip 200 is a plain surface.

Figure 2B:
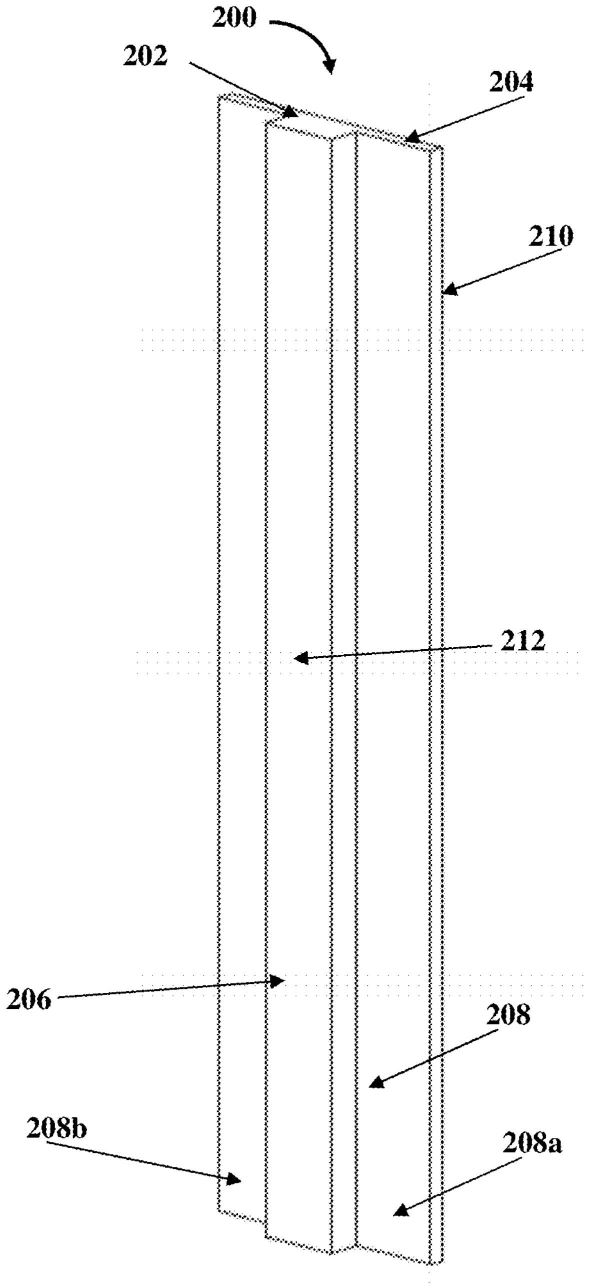
FIG. 2B exemplarily illustrates a front perspective view of the second embodiment of the sealing strip shown in FIG. 2A.

FIG. 2B exemplarily illustrates a front perspective view of the second embodiment of the sealing strip 200.

Figure 2C:
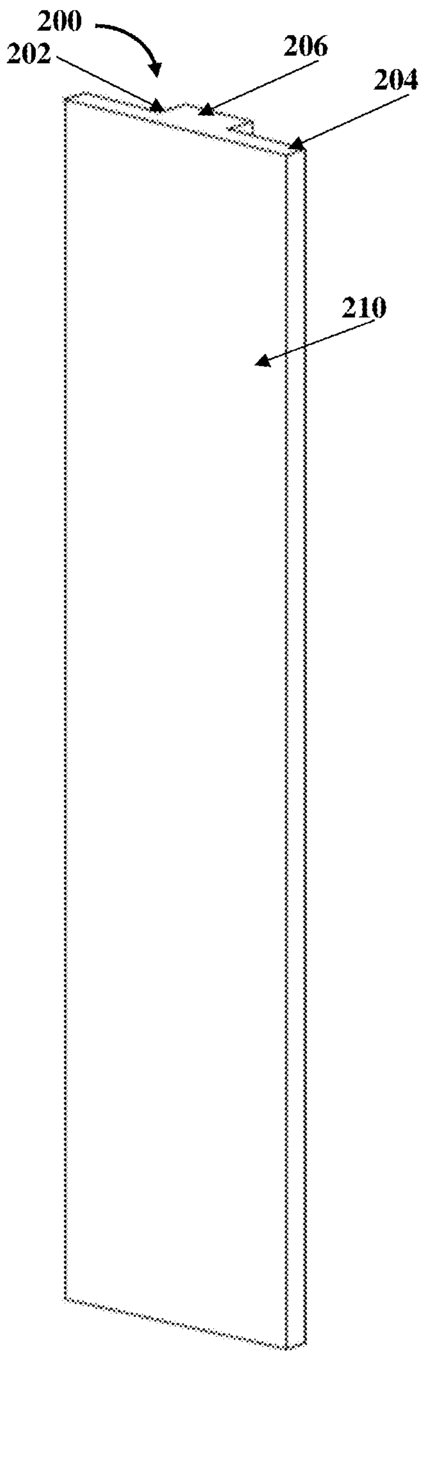
FIG. 2C exemplarily illustrates a rear perspective view of the second embodiment of the sealing strip shown in FIG. 2A.

FIG. 2C exemplarily illustrates a rear perspective view of the second embodiment of the sealing strip 200.

Figure 2D:
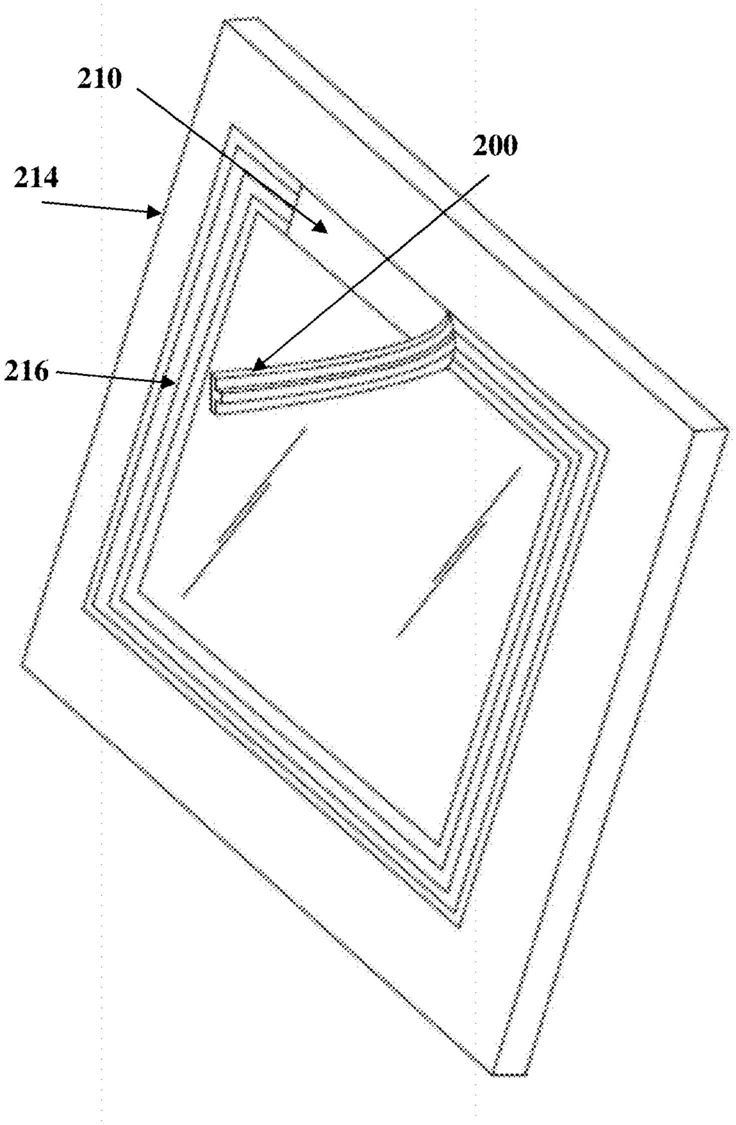
FIG. 2D exemplarily illustrates a perspective view of a cabinet door comprising a groove for affixing the sealing strip shown in FIG. 2A.

FIG. 2D exemplarily illustrates a perspective view of a cabinet door 214 comprising a groove 216 for affixing the sealing strip 200. In an embodiment, the second lateral side 210 of the sealing strip 200 comprises an adhesive layer to affix the sealing strip 200 to the cabinet door 214 in the absence of the groove 216. In an embodiment, the adhesive layer is protected by an adhesive protection film. The adhesive protection film is peeled off to reveal the adhesive layer. The sealing strip 200 is attached to the cabinet door 214 by affixing the second lateral side 210 comprising the adhesive layer.

In an embodiment, the sealing strip 200 is about ⅜ inch wide and about ⅛ inch thick. The horizontal portion 206 is about half the width of the sealing strip 200. Furthermore, the horizontal portion 206 and the vertical portion 204 have an equal thickness of about 1/16 inch each.

Figure 3A:
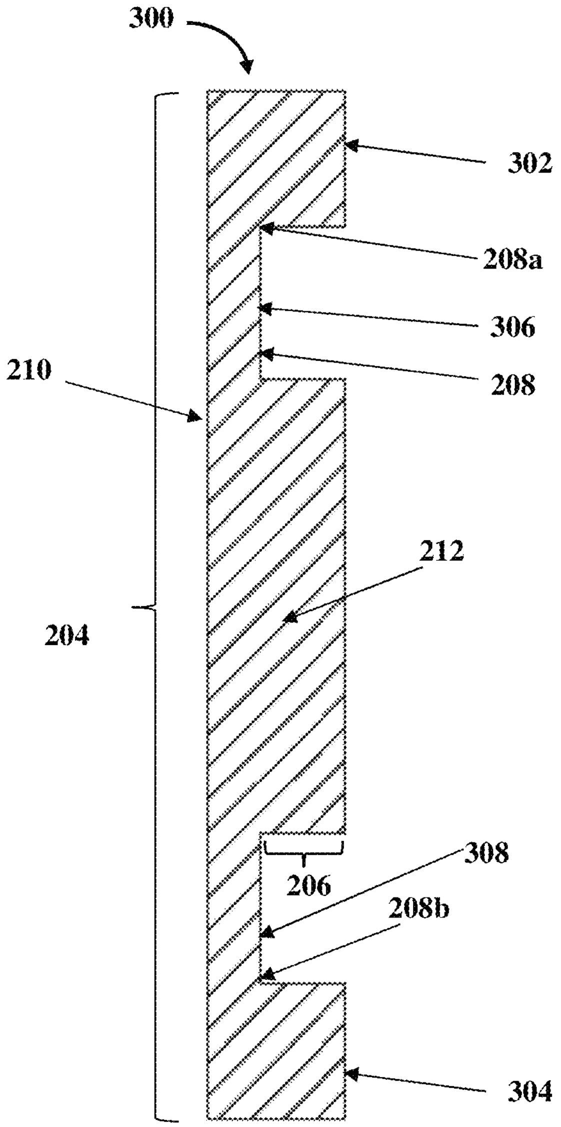
FIG. 3A exemplarily illustrates a cross-sectional view of a third embodiment of a sealing strip.

FIG. 3A exemplarily illustrates a cross-sectional view of a third embodiment of the sealing strip 300. The cross-section of the third embodiment of the sealing strip 300 disclosed herein is similar to the cross-section of the second embodiment of the sealing strip 200 illustrated in FIGS. 2A-2D, except that the third embodiment comprises the first and second wall portions 302 and 306. The vertical portion 204 of the sealing profile 202 comprises the first wall portion 302 extending from a first end 208*a* of the first lateral side 208. The first wall portion 302 is substantially parallel to the horizontal portion 206. The vertical portion 204 of the sealing profile 202 further comprises the second wall portion 304. The second wall portion 304 extends from a second end 208*b* of the first lateral side 208, parallel to the horizontal portion 206. The sealing profile 302 of the third embodiment comprises a generally E-shaped cross-section, as illustrated in FIG. 3A.

Figure 3B:
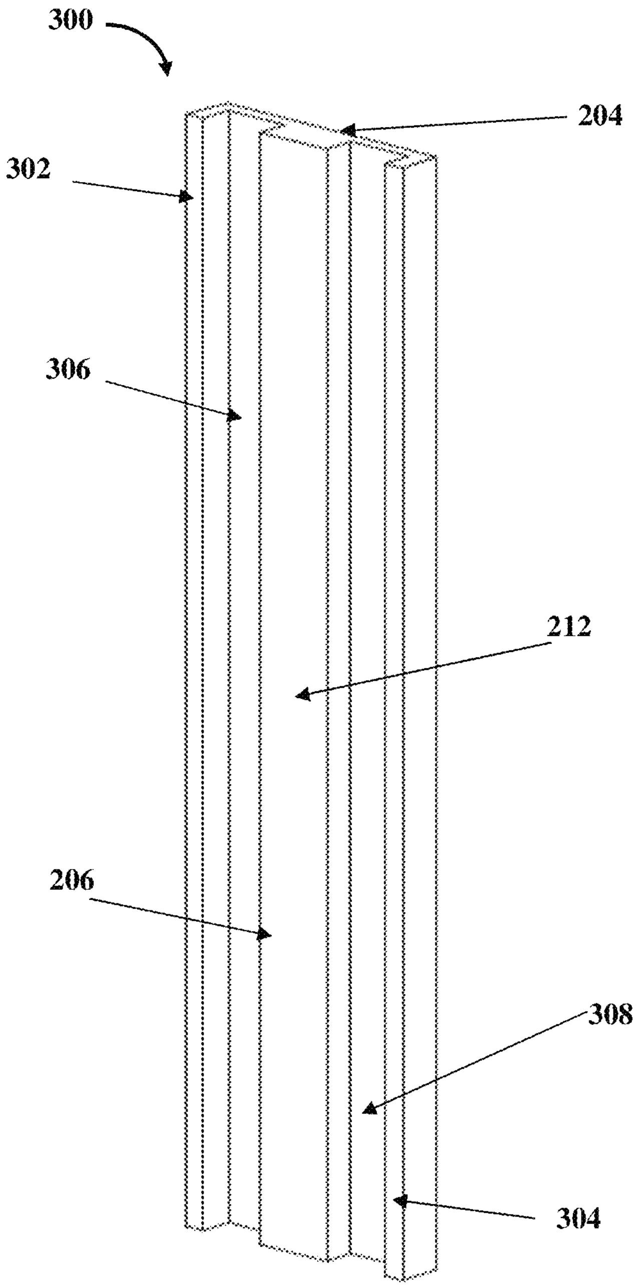
FIG. 3B exemplarily illustrates a front perspective view of the third embodiment of the sealing strip shown in FIG. 3A.

FIG. 3B exemplarily illustrates a front perspective view of the third embodiment of the sealing strip 300. As illustrated in FIGS. 3A and 3B, the sealing profile 202 further comprises a first trough portion 306 between the first wall portion 302 and the horizontal portion 206. The sealing profile 202 further comprises a second trough portion 308 between the second wall portion 304 and the horizontal portion 206.

Figure 3C:
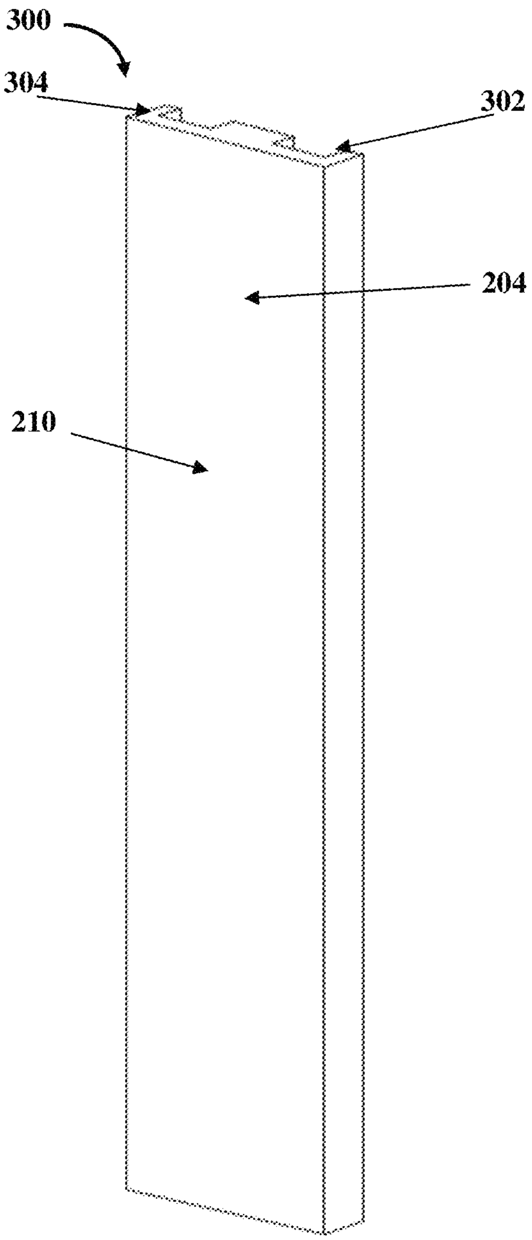
FIG. 3C exemplarily illustrates a rear perspective view of the third embodiment of the sealing strip shown in FIG. 3A.

FIG. 3C exemplarily illustrates a rear perspective view of the third embodiment of the sealing strip 300.

Figure 3D:
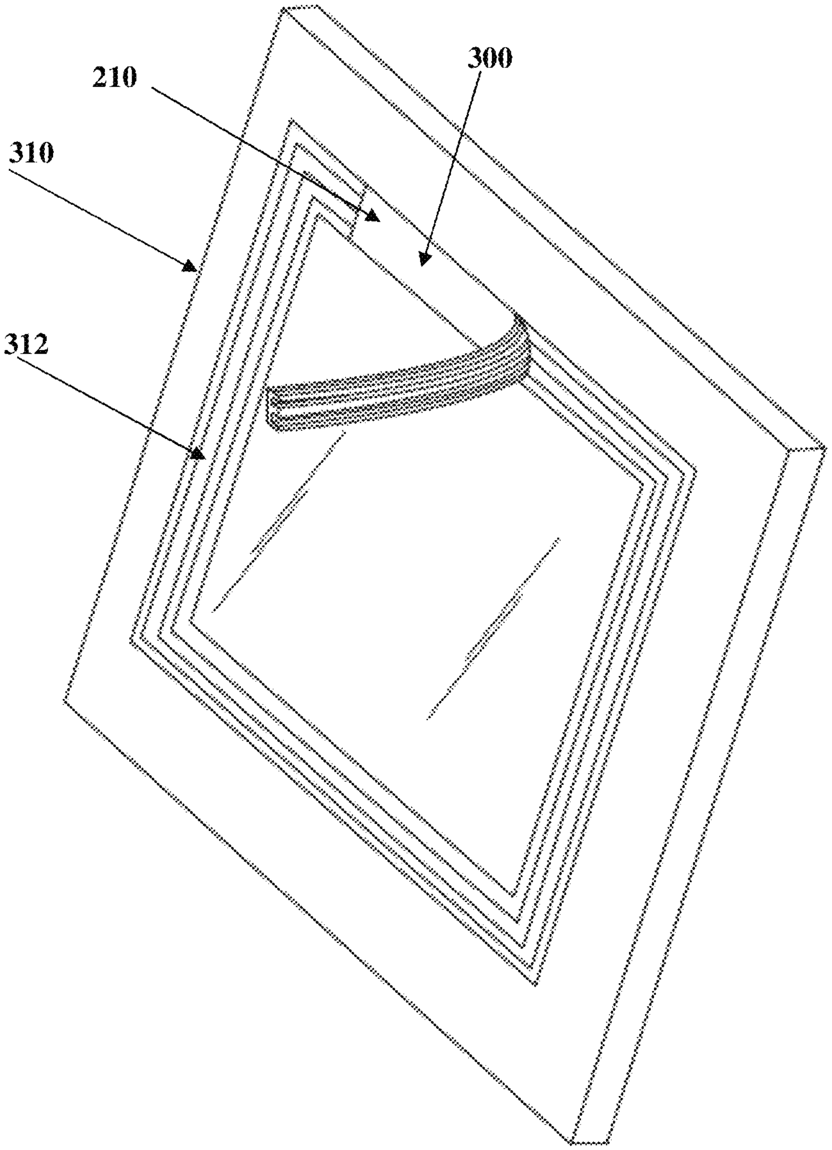
FIG. 3D exemplarily illustrates a perspective view of a cabinet door comprising a groove for affixing the sealing strip shown in FIG. 3A.

FIG. 3D exemplarily illustrates a perspective view of a cabinet door 310 comprising a groove 312 for affixing the sealing strip 300. In an embodiment, the second lateral side 210 of the sealing strip 300 comprises an adhesive layer to affix the sealing strip 300 to the cabinet door 310 in the absence of the groove 312. In an embodiment, the adhesive layer is protected by an adhesive protection film. The adhesive protection film is peeled off to reveal the adhesive layer. The sealing strip 300 is attached to the cabinet door 310 by affixing the second lateral side 210 comprising the adhesive layer.

In an embodiment, the sealing strip 300 is about ⅜ inch wide and about ⅛ inch thick. The horizontal portion 206 of the sealing strip 300 is about half the width of the sealing strip 300. The vertical portion 204 is about ⅛ inch thick. Furthermore, the horizontal portion 206, the first wall portion 302, and the second wall portion 304 have an equal thickness of about ¼ inch each.

Figure 4A:
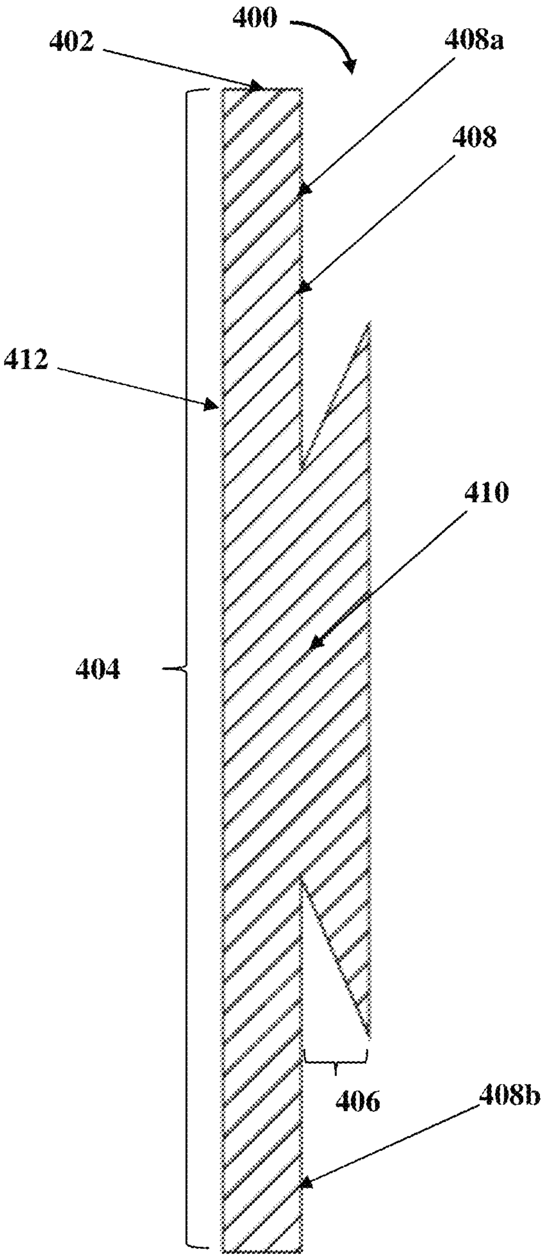
FIG. 4A exemplarily illustrates a cross-sectional view of a fourth embodiment of a sealing strip.

FIG. 4A exemplarily illustrates a cross-sectional view of a fourth embodiment of a sealing strip 400. The fourth embodiment of the sealing strip 400 is used for sealing a gap between a first surface, for example, the surface of the frontal frame 128*a*, and a second surface, for example, a surface 122*a* of the cabinet door 122 that engages with the first surface, as exemplarily illustrated in FIG. 1E. The fourth embodiment of the sealing strip 400 disclosed herein comprises a sealing profile 402 having a cross-section, wherein the cross-section of the sealing profile 402 comprises a vertically aligned rectangular base portion 404. The cross-section of the sealing profile 402 further comprises a dovetail portion 406 extending from a first lateral side 408 of the rectangular base portion 404 at a position near midway 410 on the rectangular base portion 404.

Figure 4B:
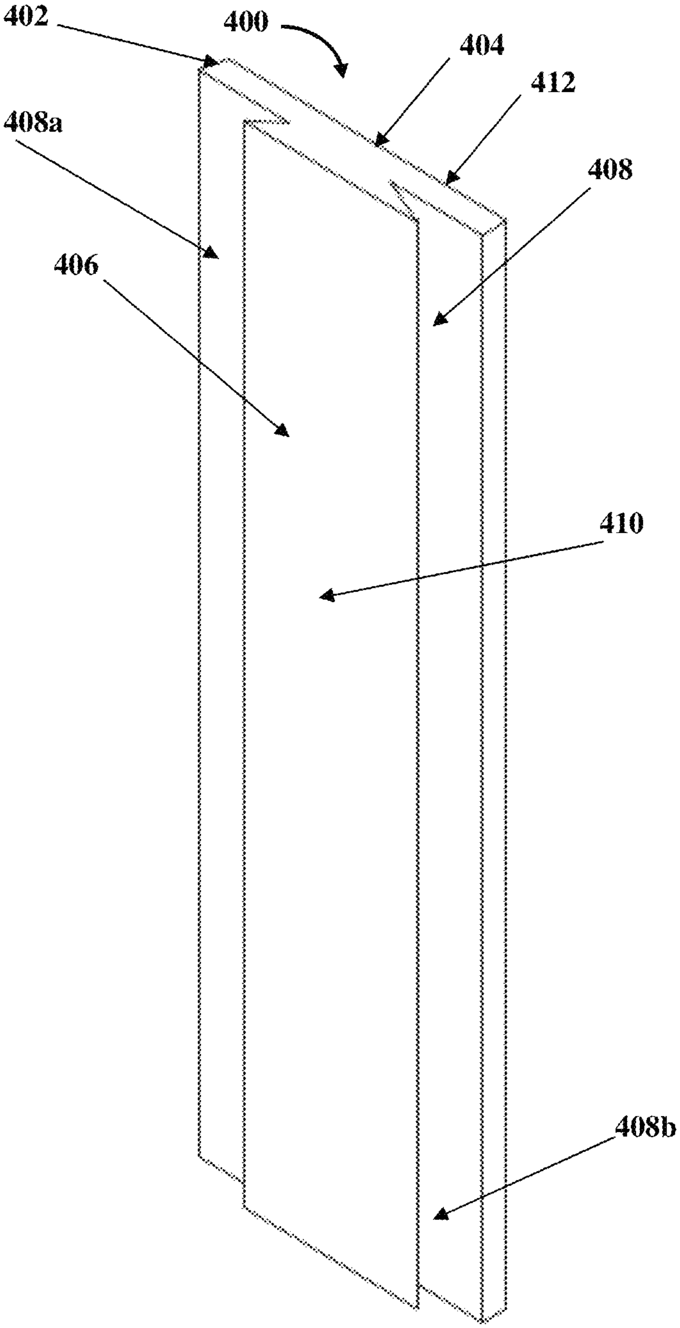
FIG. 4B exemplarily illustrates a front perspective view of the fourth embodiment of the sealing strip shown in FIG. 4A.

FIG. 4B exemplarily illustrates a front perspective view of the fourth embodiment of the sealing strip 400. The dovetail portion 406 of the sealing profile 402 is configured to slide into a slot, for example a dovetail slot in a cabinet door. In an embodiment, the second lateral side 412 of the sealing strip 400 comprises an adhesive layer to affix the sealing strip 400 to the cabinet door in the absence of a groove in the cabinet door. In an embodiment, the adhesive layer is protected by an adhesive protection film. The adhesive protection film is peeled off to reveal the adhesive layer. The sealing strip 400 is attached to the cabinet door by affixing the second lateral side 412 comprising the adhesive layer.

In an embodiment, the sealing strip 400 is about ⅜ inch wide and about ⅛ inch thick. The vertically aligned rectangular base portion 404 and the dovetail portion 406 are each about half the thickness of the sealing strip 400.

Figure 5A:
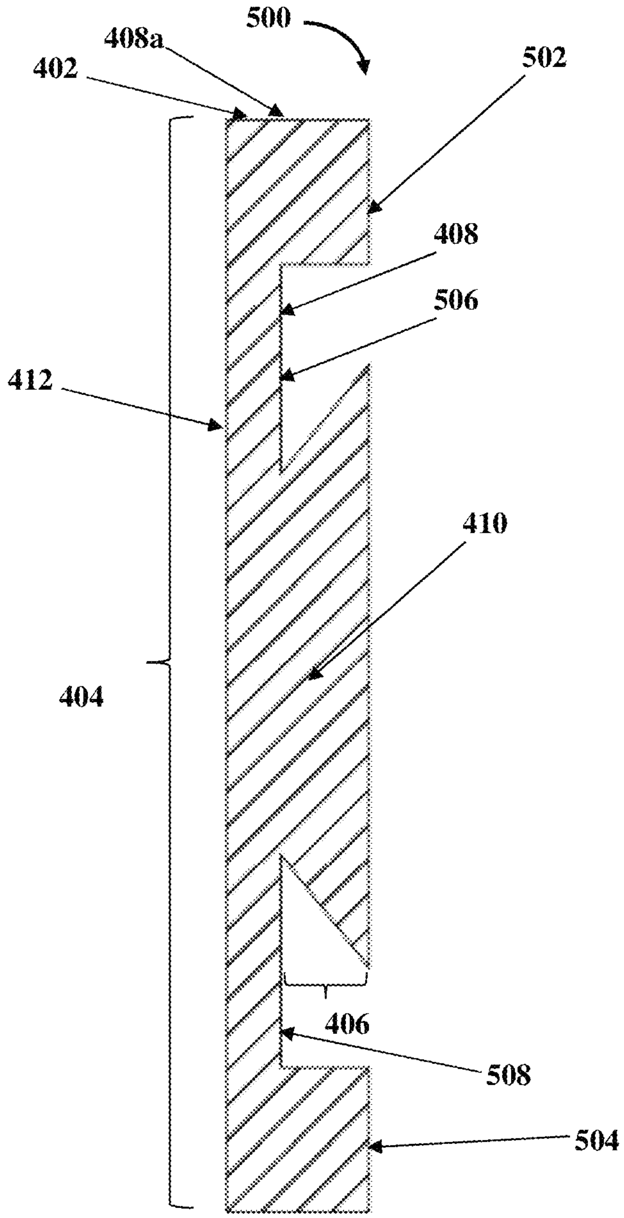
FIG. 5A exemplarily illustrates a cross-sectional view of a fifth embodiment of a sealing strip.
Figure 5B:
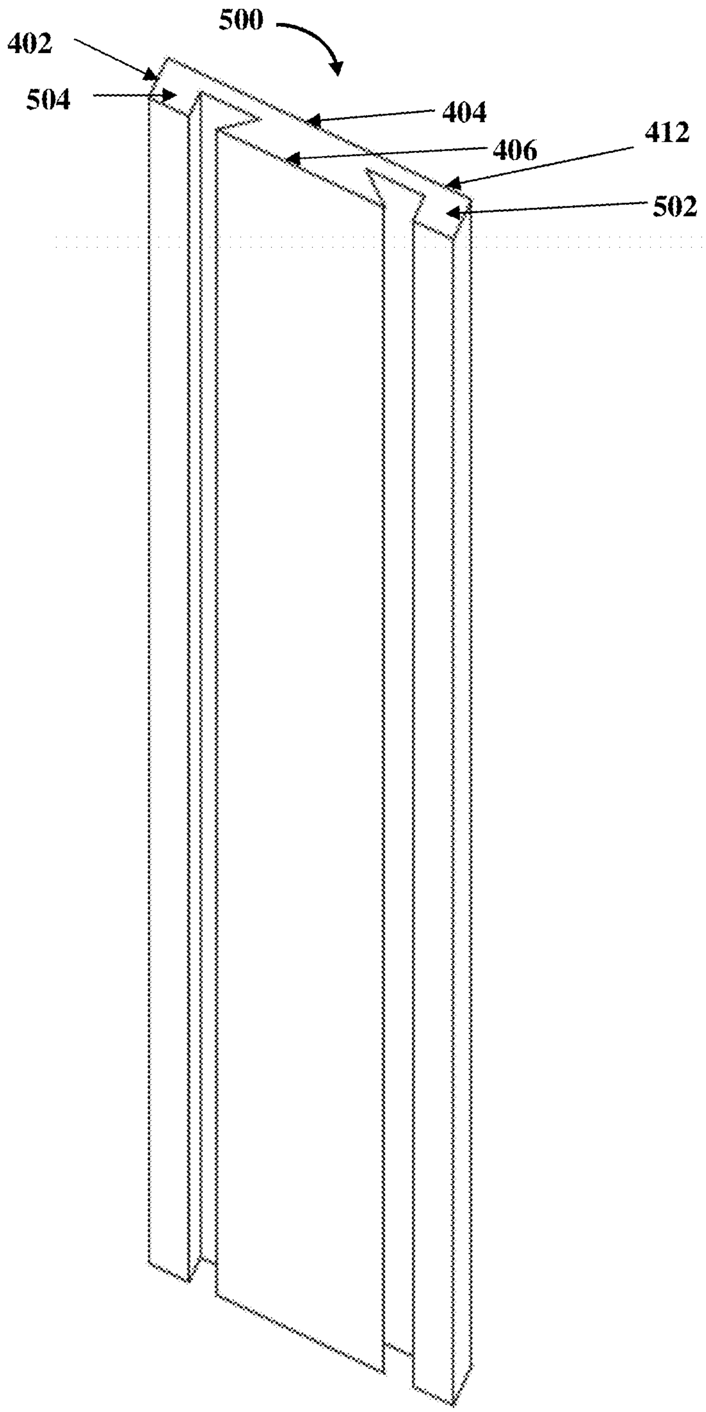
FIG. 5B exemplarily illustrates a front perspective view of the fifth embodiment of the sealing strip shown in FIG. 5A.

FIG. 5A exemplarily illustrates a cross-sectional view of a fifth embodiment of the sealing strip 500. The cross-section of the fifth embodiment of the sealing strip 500 disclosed herein is similar to the cross-section of the fourth embodiment of the sealing strip 400 illustrated in FIGS. 4A and 4B, except the fifth embodiment comprises the first and second wall portions 502 and 504. The rectangular base portion 404 of the sealing profile 402 comprises a first wall portion 502 extending from a first end 408*a* of the first lateral side 408 of the rectangular base portion 404. The first wall portion 502 is perpendicular to the first lateral side 408 of the rectangular base portion 404. The second wall portion 504 extends from a second end 408*b* of the first lateral side 408 of the rectangular base portion 404. The second wall portion 504 is perpendicular to the first lateral side 408 of the rectangular base portion 404. FIG. 5B exemplarily illustrates a front perspective view of the fifth embodiment of the sealing strip 500.

In an embodiment, the sealing strip 500 is about ⅜ inch wide and about ⅛ inch thick. The vertically aligned rectangular base portion 404, the dovetail portion 406, the first wall portion 502, and the second wall portion 504 are each about half the thickness of the sealing strip 500. The vertically aligned rectangular base portion 404 is about ⅛ inch thick. Furthermore, the dovetail portion 406, the first wall portion 502, and the second wall portion 504, and the horizontal portion 206 have an equal thickness of about ¼ inch each.

The embodiments of the sealing strip 100-500 disclosed herein provide users with a seal that can be applied to furniture, for example, cabinets, drawers, doors, etc., to prevent fine particulate matter from building up within an interior space enclosed by the embodiments of the sealing strip 100-500. The sealing profiles 102-402 are configured to firmly secure the embodiments of the sealing strip 100-500 to a groove 126, 216 and 312, for example a pre-integrated or preformed groove, in the furniture 122, 214 and 310. Alternatively, the adhesive layer is configured to firmly affix the embodiments of the sealing strip 100-500 to a surface of the furniture 122, 214 and 310. The embodiments of the sealing strip 100-500 are configured to be installed along a perimeter of the furniture. In an embodiment, a length of the sealing strip 100, 200, 300, 400 or 500 overlaps with another length of the sealing strip 100, 200, 300, 400 or 500 near a corner of the furniture. In another embodiment, the sealing strip 100, 200, 300, 400 or 500 is cut along its sides to form a notch (not shown) to facilitate inward bending of the sealing strip 100, 200, 300, 400 or 500. The embodiments of the sealing strip 100-500 disclosed herein provide a complete seal, and ensure items stored inside cabinets, drawers, etc., do not accumulate dust and require additional cleaning. The embodiments of the sealing strip 100-500 further function as seals for doors, windows, cabinets, drawers and other furniture in kitchens, bathrooms, living rooms, bedrooms, office, etc.

The foregoing examples have been provided merely for the purpose of explanation and are in no way to be construed as limiting of the portable snowboard disclosed herein. While the portable snowboard has been described with reference to various embodiments, it is understood that the words, which have been used herein, are words of description and illustration, rather than words of limitation. Furthermore, although the portable snowboard has been described herein with reference to particular means, materials, and embodiments, the portable snowboard is not intended to be limited to the particulars disclosed herein; rather, the portable snowboard extends to all functionally equivalent structures, methods and uses, such as are within the scope of the appended claims. Those skilled in the art, having the benefit of the teachings of this specification, may effect numerous modifications thereto and changes may be made without departing from the scope and spirit of the portable snowboard disclosed herein in its aspects.

I claim:

1. A sealing strip for integration with a pre-integrated or preformed groove within a furniture, to prevent ingress of dust into the furniture, the sealing strip comprising:

a deformable sealing profile comprising a teardrop cross-section, wherein the deformable sealing profile comprises a first outwardly curved side, and a second outwardly curved side opposite to the first outwardly curved side, wherein ends of the first outwardly curved side and the second outwardly curved side engage to define a rounded leading edge, and a sharp trailing edge opposite to the rounded leading edge, and wherein the deformable sealing profile is configured to firmly secure the sealing strip to the pre-integrated or the preformed groove in the furniture, thereby preventing the ingress of the dust into the furniture;

a channel running along a length of the sealing strip;

a plurality of parallel aligned reinforcement ribs on a sidewall of the channel proximal to the first outwardly curved side, wherein the reinforcement ribs extend along the length of the sealing strip; and an adhesive layer on the first outwardly curved side on an outer surface of the deformable sealing profile, wherein the pre-integrated or the preformed groove is configured to accommodate the first outwardly curved side of the deformable sealing profile, wherein the adhesive layer is used to affix the first outwardly curved side of the sealing strip in the pre-integrated or the preformed groove, and wherein the sealing strip is cut in the sharp trailing edge to form a notch to facilitate inward bending of the sealing strip and to thereafter affix the first outwardly curved side of the sealing strip inside bends in the pre-integrated or the preformed groove.

2. The sealing strip of claim 1, wherein the channel is defined by the first outwardly curved side, the second outwardly curved side, the sharp trailing edge, and the rounded leading edge.

3. The sealing strip of claim 1, wherein the furniture is one of a door, a window, a cabinet, a drawer, a furniture in a kitchen, a furniture in a bathroom, a furniture in a living room, a furniture in a bedroom, and a furniture in an office.

* * * * *